(12) United States Patent
Vujic et al.

(10) Patent No.: US 10,606,830 B2
(45) Date of Patent: *Mar. 31, 2020

(54) MULTI-VERSION DATA SYSTEM NESTED TRANSACTIONS ISOLATION

(71) Applicant: Microsoft Technology Licensing, LLC, Redmond, WA (US)

(72) Inventors: Nikola Vujic, Belgrade (RS); Milos Andelkovic, Smederevo (RS); Marko Zivanovic, Sopot (RS); Craig Steven Freedman, Sammamish, WA (US); Erik Ismert, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/016,029

(22) Filed: Jun. 22, 2018

(65) Prior Publication Data
US 2018/0307721 A1     Oct. 25, 2018

Related U.S. Application Data

(63) Continuation of application No. 14/723,303, filed on May 27, 2015, now Pat. No. 10,019,476.

(51) Int. Cl.
*G06F 16/20* (2019.01)
*G06F 16/23* (2019.01)

(52) U.S. Cl.
CPC ...... *G06F 16/2379* (2019.01); *G06F 16/2329* (2019.01); *G06F 16/2336* (2019.01)

(58) Field of Classification Search
None
See application file for complete search history.

(56) References Cited

U.S. PATENT DOCUMENTS

| 7,213,020 B1 * | 5/2007 | Pal | G06F 16/28 707/703 |
| 7,290,056 B1 * | 10/2007 | McLaughlin, Jr. | H04L 43/0852 709/201 |
| 2009/0077083 A1 * | 3/2009 | Magruder | G06F 9/467 |

* cited by examiner

*Primary Examiner* — Jau Shya Meng
(74) *Attorney, Agent, or Firm* — Workman Nydegger

(57) ABSTRACT

A data system in which a parent transaction that has multiple nested transactions has isolation between the nested transactions. Each of at least some of the plurality of operations are included within a nested transaction within the parent transaction. For each of at least some of the nested transactions, a begin transaction identifier is assigned to the nested transaction; and on or around completion of the nested transaction, a completion transaction identifier is assigned as a statement identifier at least one object version operated upon by the nested transaction. Visibility of a particular version of an object to an active nested transaction may be verified by comparing the begin transaction identifier of the active nested transaction to the statement identifier of the particular version of the object. The comparison is done such that visibility achieves the proper isolation between nested transactions.

20 Claims, 15 Drawing Sheets

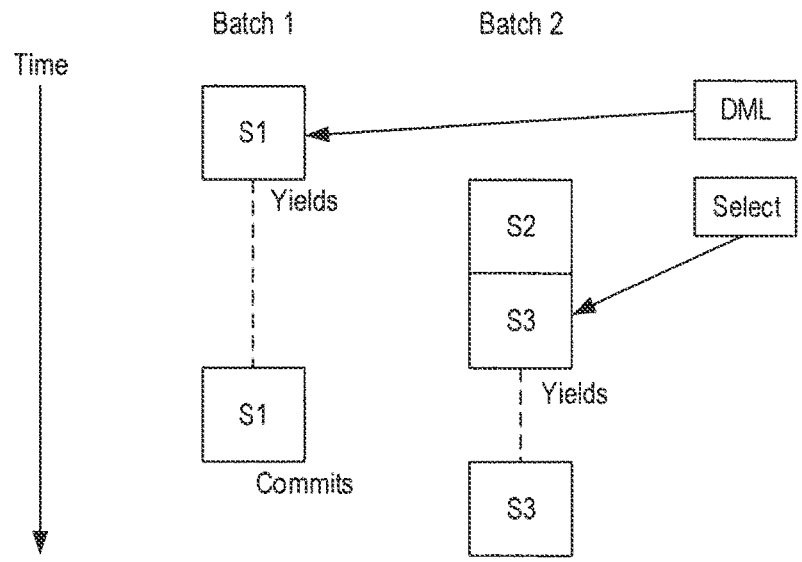
*Figure 7A*
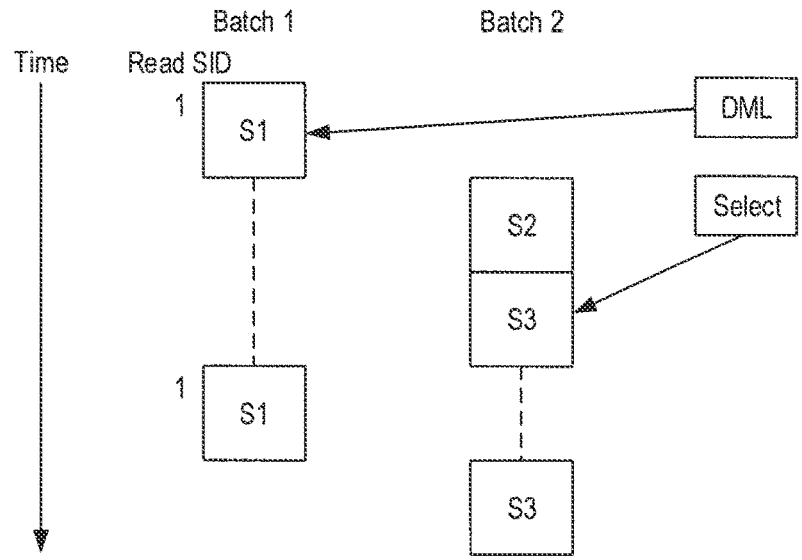
*Figure 7B*
Insert By S1 (Tn1)
| Begin | End | Statement ID | Data |
|---|---|---|---|
| Tn1 Id | Inf. | ? | ... |
*Figure 7C*

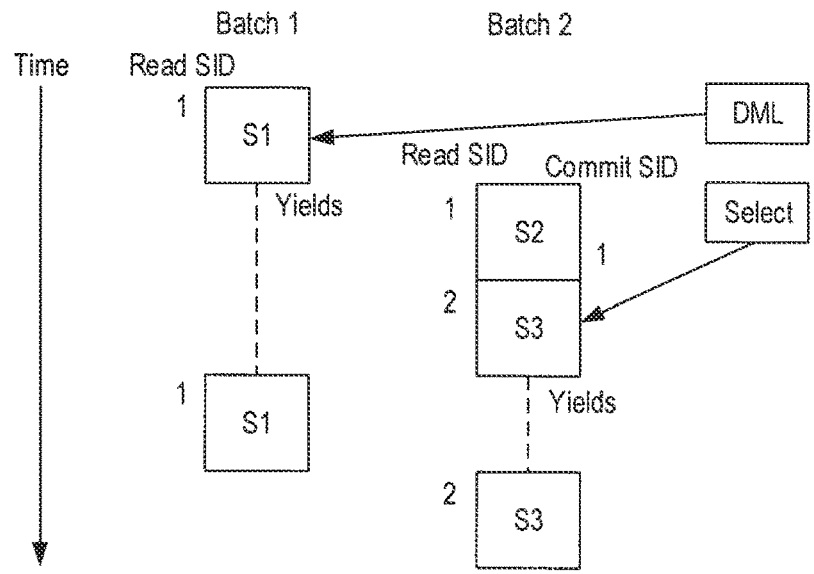
Figure 7F
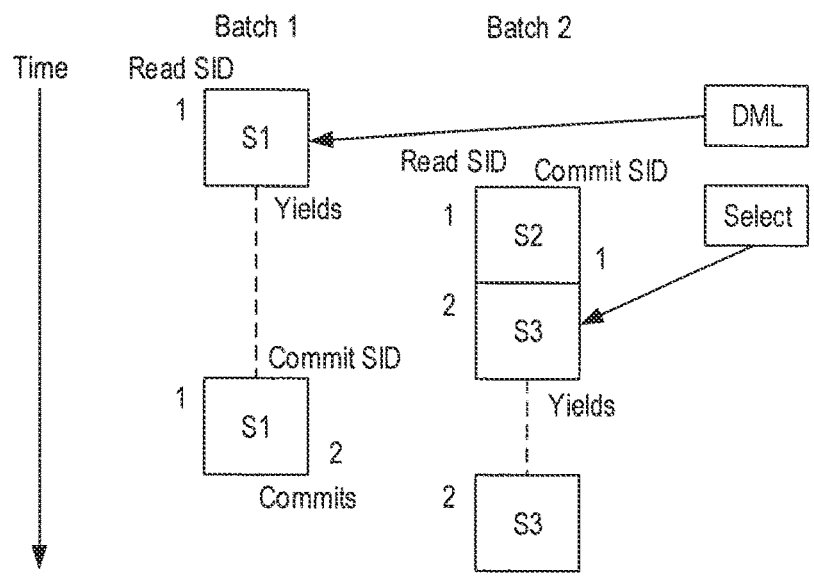
Figure 7G
Insert By S1 (Tn1)
| Begin | End | Statement ID | Data |
|-------|-----|--------------|------|
| Tp Id | Inf. | 2 | ... |
Figure 7H

| | Row Version | | | |
|---|---|---|---|---|
| Tn1INSERT | Begin | End | Stmt. ID | Data |
| | Tn1 Id | Inf. | ? | ... |

| | Row Version | | | |
|---|---|---|---|---|
| | Begin | End | Stmt. ID | Data |
| Tn1 INSERT | Tp Id | Inf. | 1 | ... |
| Tn1 Commits | | | | |

| | Row Version | | | |
|---|---|---|---|---|
| | Begin | End | Stmt. ID | Data |
| Tn1 INSERT | | | | |
| Tn1 Commits | Tp Id | Inf. | 1 | ... |
| Tn3 INSERT | Begin | End | Stmt. ID | Data |
| | Tn3 Id | Inf. | ? | ... |

| | Row Version | | | |
|---|---|---|---|---|
| | Begin | End | Stmt. ID | Data |
| Tn1 INSERT Tn1 Commits | Tp Id | Inf. | 1 | ... |
| | Begin | End | Stmt. ID | Data |
| Tn3 INSERT Tn3 Commits | Tp Id | Inf. | 2 | ... |

| | Row Version | | | |
|---|---|---|---|---|
| | Begin | End | Stmt. ID | Data |
| Tn1 INSERT | | | | |
| Tn1 Commits | Tp Id | Tn4 Id | 1 | ... |
| | | | | |
| Tn3 INSERT | Begin | End | Stmt. ID | Data |
| Tn3 Commits | Tp Id | Tn4 Id | 2 | ... |
| Tn4 DELETE | | | | |

MULTI-VERSION DATA SYSTEM NESTED TRANSACTIONS ISOLATION

CROSS REFERENCE TO RELATED APPLICATIONS

This application is a continuation of and claims benefit from U.S. application Ser. No. 14/723,303, entitled "MULTI-VERSION DATA SYSTEM NESTED TRANSACTIONS ISOLATION", which was filed on May 27, 2015, which will issue on Jul. 10, 2018 as U.S. Pat. No. 10,019,476, and the entire contents of which are incorporated by reference in their entirety.

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Data systems (such as databases) allow some order to be imposed upon the vast world of information that is available. Often, operations are performed on the data system in a transaction, such that the operations within the transaction are all performed (if the transaction is committed) or not performed (if the transaction is not committed). This is known as the atomic property of transactions. Another property of transactions is that they are isolated from other transactions. Transactions may even be nested within other transactions. In that case, each nested transaction under a parent transaction is to be isolated from each other with respect to write-access. Read-only transactions do not need isolation.

For instance, a client may submit multiple batches of transactions to a data system under a single logical transaction. In that case, each transaction in the batch of transactions may be a nested transaction under the single logical parent transaction. Such batches of nested transactions may run in an interleaved fashion (where one batch yields occasionally to the other), or in a concurrent fashion (where both batches of transactions are processed in parallel concurrently).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a data system in which a parent transaction that has multiple nested transactions has isolation enforced between the nested transactions. In some embodiments, the nested transaction may contain one or more operations to be performed on the data system. Isolation between nested transactions in this context means that operation(s) within a particular nested transaction should only see changes made by operation(s) within another nested transaction that finished before the particular nested transaction started executing. Once all nested transactions have completed, the parent transaction can then decide whether to commit or abort the entirety of the parent transaction.

Embodiments described herein relate to the performing of a parent transaction that includes a plurality of operations within a multi-version data system, in which each object in the multi-version data system may have one or more versions. Each of at least some of the plurality of operations are within a corresponding nested transaction within the parent transaction. For each of at least some of the nested transactions, a begin transaction identifier is assigned to the nested transaction; and on or around completion of the nested transaction, a completion transaction identifier is assigned as a statement identifier to at least one and potentially all object versions operated upon by the nested transaction (although if an object version is only read from, assignment of the completion transaction identifier is not needed for that object version, since reading alone falls outside the scope of the term "operated upon" as the term is used herein). From the perspective of the parent transaction, each nested transaction behaves as a single statement (i.e. an operation that either succeeds or fails. That is the reason for calling this a "statement identifier." Visibility of a particular version of an object to an active nested transaction may be verified by comparing the begin transaction identifier of the active nested transaction to the statement identifier of the particular version of the object. The comparison is done such that visibility achieves the proper isolation between nested transactions.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 7A through 7H illustrate several stages in processing of one example parent transaction that includes two interleaved batches.

DETAILED DESCRIPTION

Figure 1:
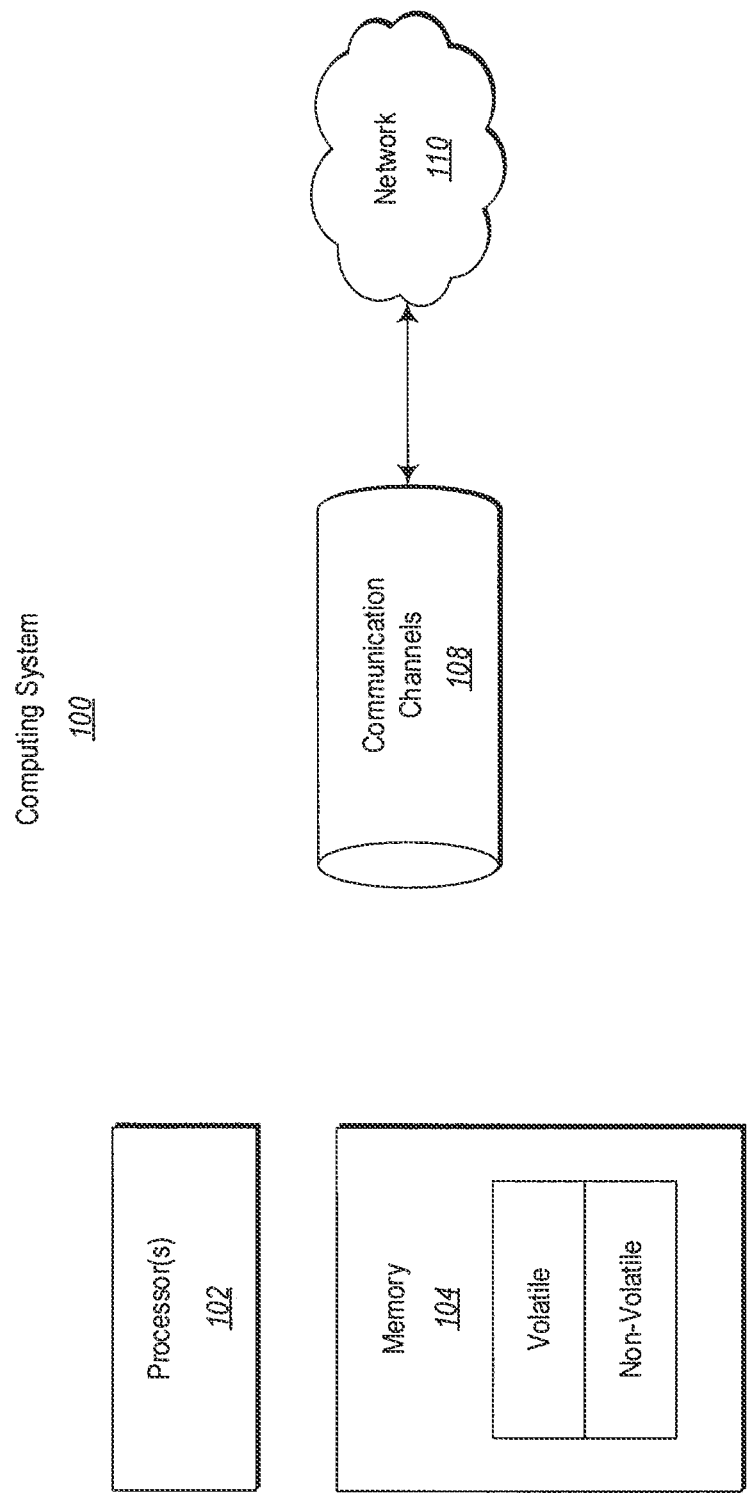
FIG. 1 abstractly illustrates a computing system in which some embodiments described herein may be employed, and which may operate to implement any of the components, systems, managers, and modules shown in the subsequent drawings.

At least some embodiments described herein relate to a data system in which a parent transaction that has multiple nested transactions has isolation enforced between the nested transactions. In some embodiments, the nested transaction may contain one or more operations to be performed on the data system. Isolation between nested transactions in this context means that operation(s) within a particular nested transaction should only see changes made by operation(s) within another nested transaction that finished before the particular nested transaction started executing. Once all nested transactions have completed, the parent transaction can then decide whether to commit or abort the entirety of the parent transaction.

Embodiments described herein relate to the performing of a parent transaction that includes a plurality of operations within a multi-version data system. Each of at least some of the plurality of operations are within a corresponding nested transaction within the parent transaction. For each of at least some of the nested transactions, a begin transaction identifier is assigned to the nested transaction; and on or around completion of the nested transaction, a completion transaction identifier is assigned as a statement identifier to at least some and potentially all object versions operated upon by the nested transaction (although if an object version is only read from, assignment of the completion transaction identifier is not needed for that object version, since reading alone falls outside the scope of the term "operated upon" as the term is used herein). From the perspective of the parent transaction, each nested transaction behaves as a single statement (i.e. an operation that either succeeds or fails. That is the reason for calling this a "statement identifier."

Visibility of a particular version of an object to an active nested transaction may be verified by comparing the begin transaction identifier of the active nested transaction to the statement identifier of the particular version of the object. The comparison is done such that visibility achieves the proper isolation between nested transactions. Active nested transactions are automatically isolated from each other. Accordingly, the visibility determination mechanisms described herein apply only for changes that were committed to the parent transaction.

Some introductory discussion of a computing system will be described with respect to FIG. 1. Then, the performance of a parent transaction in which transactions contained therein are nested (thereby allowing multiple batches of operations to run in a shared transaction) will be described with respect to FIGS. 2 through 8N.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads). With such objects and processes operating upon the computing system, the computing system is the equivalent of a special purpose computer that functions for the special purpose accomplished by the objects.

In the description that follows, embodiments are described with reference to acts that are performed by one or more computing systems. If such acts are implemented in software, one or more processors (of the associated computing system that performs the act) direct the operation of the computing system in response to having executed computer-executable instructions, thereby converting and configuring the computing system for a more specialized purpose than without such direction. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also may include a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also may include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, and so forth) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
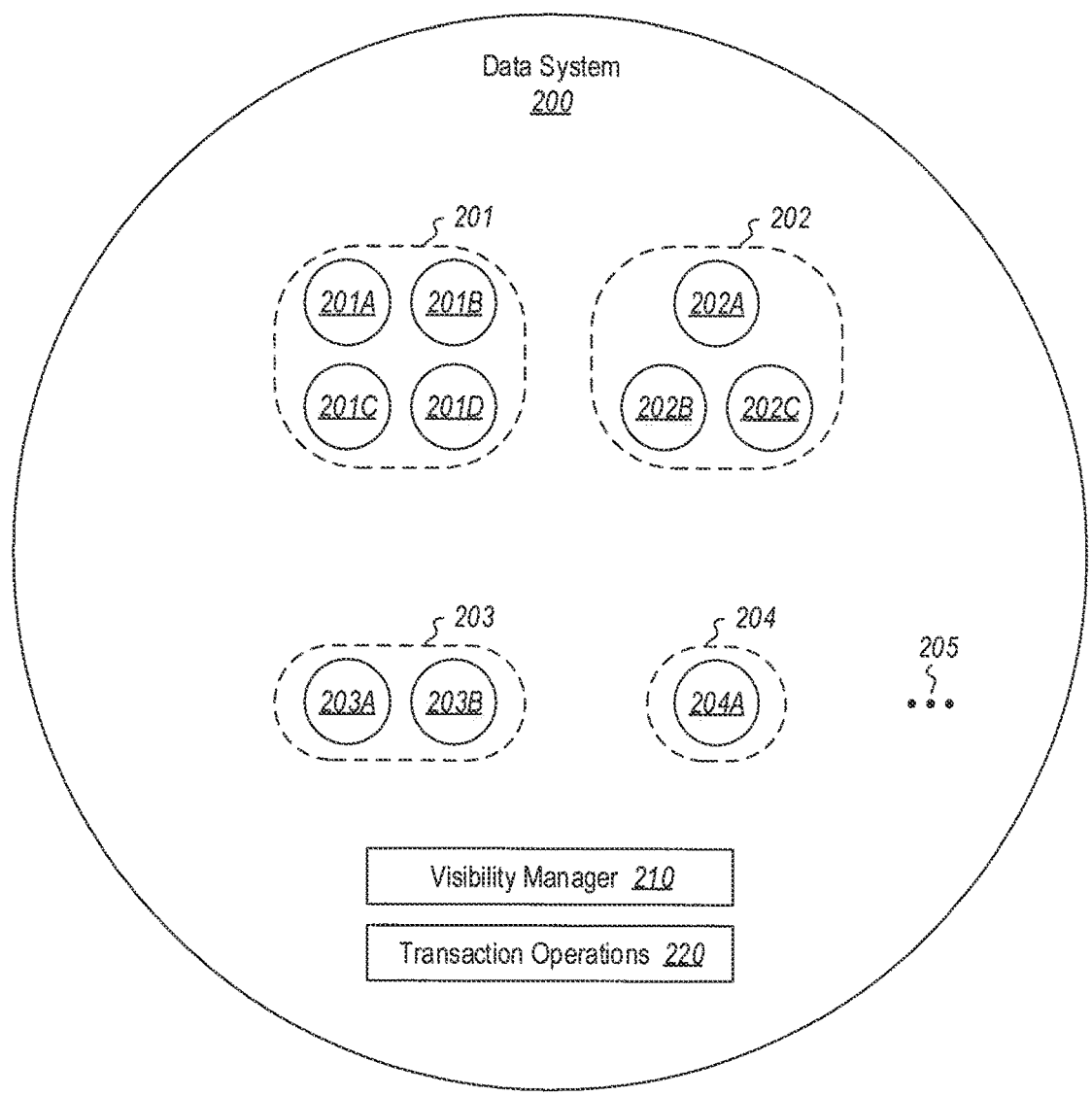
FIG. 2 abstractly illustrates a multi-version data system in which the principles described herein may operate, and in which each object may have multiple associated versions which may be conditionally visible.

FIG. 2 illustrates a multi-version data system 200 in which the principles described herein may operate. The multi-version data system 200 stores multiple objects, but also retains one or more versions of each object. For instance, the data system is illustrated as containing four objects 201, 202, 203 and 204. However, the ellipses 205 represent that the data system 200 may contain any number of objects from as few as one, to as many as billions or more, with no upper limit except those imposed by the capabilities of the system.

In a multi-version data system, each object may have potentially multiple versions. In this particular example, object 201 is illustrated as including four versions 201A, 201B, 201C and 201D; object 202 is illustrated as including three versions 202A, 202B and 202C; object 203 is illustrated as including two versions 203A and 203B; and object 204 is illustrated as having only a single version 204A. Of course, this is just for purposes of an example. The state and number of versions of an object will depend on the history of operations (in particular updating) on the object.

Each time the object is updated, a new version of the object is created, without destroying the previous version. When a delete operation is issued against an object, the version of the object is not actually destroyed, but is marked with an ending time, thus making finite the time range in which the object version may be visible. Note that this "time" is not necessarily related to physical time and can be just logical or application time. For instance, the time might just be a simple integer. In such a representation, a pre-defined comparative function will define whether some version is older than another. In any case, operations operating on the data as it existed after that point in time will not recognize the version of the object deleted. An insert operation on its own will create a new object having its first version.

Figure 3:
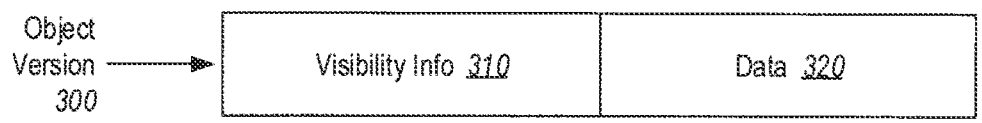
FIG. 3 abstractly illustrates an example of a data structure of an object version which includes data itself, and visibility information representing the condition(s) for this particular version of the object being visible.

FIG. 3 illustrates an example of a data structure of an object version 300. The object version includes visibility information 310 and data 320. The data 320 is the data of the object version itself, whereas the visibility information 310 represents the conditions whereby an operation will recognize the object version 300 as visible. In this description and in the claims, an object version is visible to an operation if the object version can be read.

The visibility information might include, for instance, a time range. If an operation or transaction began within that time range, then the object version would be visible, and otherwise, the object version would not be visible. The time range begins with the time of the object version 300 was created in the data system, and ends with the time that the object version 300 was deleted or updated (either deletion or updating rendering the object version obsolete after that time). In some embodiments, at most one version of an object will be visible at any given time. This might be accomplished by ensuring that any time ranges are not overlapping. If the visibility information represent a particular time range, then the multi-version data system is inherently snapshotted, since given a particular time, the visibility of each of the objects 201 through 205 may be determined.

The data 320 itself may be unstructured data or structured data. For instance, if the data system 300 was blob storage, the data 320 might be unstructured data. However, if the data system 300 was a relational database, the data 320 could be structured and perhaps be a database object, such as a table or a table portion. In one embodiment, the data system 300 is a relational database, and each object is a table row.

A visibility manager 210 determines which operation will have visibility on which version of which object. A transaction operations module 220 is configured to perform transactions of operations upon the objects within the data system 200. In accordance with the principles described herein, the transaction operations module 220 also handles hierarchically structured transactions in which a parent transaction can have one or more nested transactions, while ensuring isolation between nested transactions.

Figure 4A:
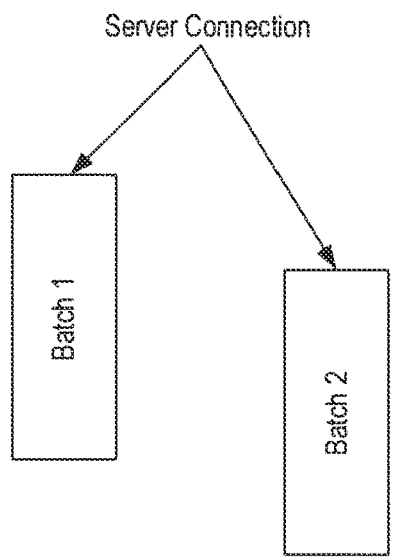
FIG. 4A illustrates two batches of operations ("Batch 1" and "Batch 2") that are executed concurrently over a single connection (e.g., in a single logical transaction)
Figure 4B:
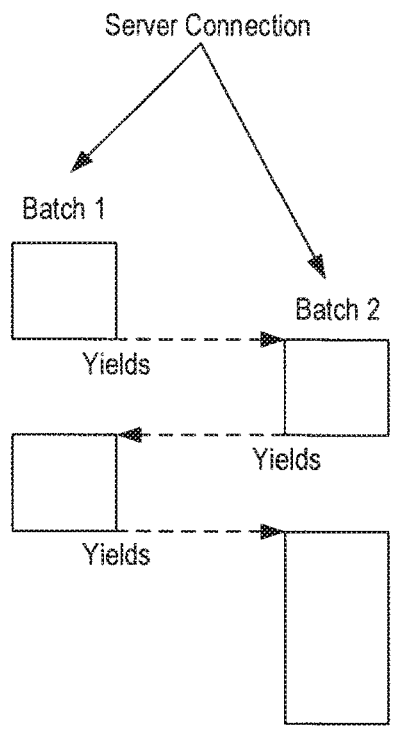
FIG. 4B illustrates two batches of operations that are executed in an interleaved fashion over a single connection (with each yielding to the other at appropriate points of execution)

By encapsulating operations within isolated nested transactions that are nested within a parent transaction, multiple concurrent or interleaved batches of operations may be performed in a consistent manner. For instance, FIG. 4A illustrates two batches of operations ("Batch 1" and "Batch 2") that are executed concurrently over a single connection (e.g., in a single logical transaction). FIG. 4B illustrates two batches of operations that are executed in an interleaved fashion (with each yielding to the other at appropriate points of execution). Each batch constitutes a sequence of operations that are performed sequentially. Accordingly, the batches 1 and 2 may be performed as part of a shared transaction.

Figure 5:
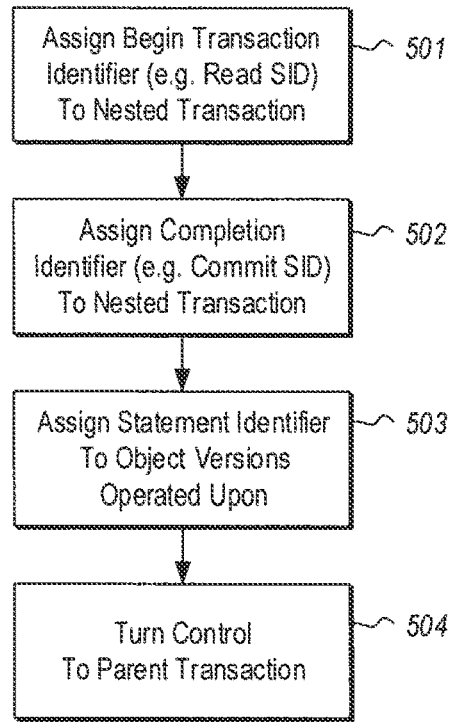
FIG. 5 illustrates a flowchart of a method for performing a parent transaction in a manner that nested transactions within the parent transaction are kept isolated in accordance with the principles described herein.

FIG. 5 illustrates a method 500 for performing a parent transaction in a manner that nested transactions within the parent transaction are kept isolated in accordance with the principles described herein. Each nested transaction encapsulates one or more operations in a particular batch of operations. For instance, each operation is executed under one nested transaction. The parent transaction does not modify objects directly. Because isolation between nested transactions is achieved, concurrent or interleaved processing of multiple batches of operations in a single parent transaction may be achieved.

The method 500 is performed for each nested transaction, and may be performed by, for example, the transaction operations module 220 of FIG. 2. At or around the beginning of the nested transaction, a begin transaction identifier is assigned to the nested transaction (act 501). At or around completion of the nested transaction, a completion transaction identifier is potentially assigned to the nested transaction (act 502). Furthermore, a completion transaction identifier is assigned as a statement identifier to at least one (and preferably all) object versions operated upon by the nested transaction (act 503). Of course, act 503 does not occur if the nested transaction is a read-only transaction as there would be no rows operated upon by the nested transaction. Thus, if a particular object is changed multiple times within various nested transactions of the parent transaction, there may be several corresponding object versions with corresponding unique statement identifiers.

Furthermore, upon completion of the nested transaction, the nested transaction turns over control over the commit or abort of the nested transaction to the parent transaction (act 504). For instance, perhaps the version of the object that was operated upon by the nested transaction is amended to show that transfer of such control in a manner that is interpretable by the parent transaction.

Figure 6:
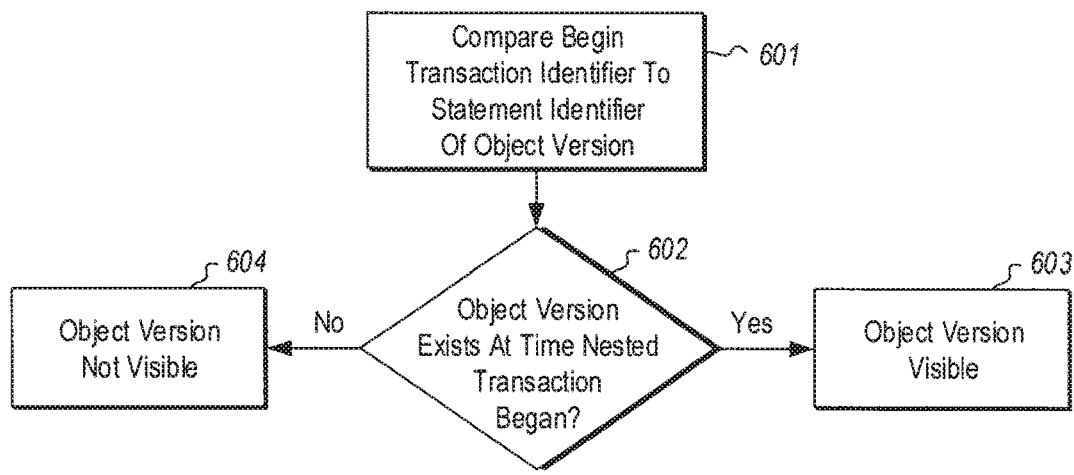
FIG. 6 illustrates a flowchart of a method for verifying visibility of a particular version of an object to an active nested transaction.

In this context, FIG. 6 illustrates a flowchart of a method 600 for verifying visibility of a particular version of an object to an active nested transaction. The method 600 may be performed by, for instance, the visibility manager 210 of FIG. 2. The particular version of the object was operated upon by a completed nested transaction and thus, in accordance with the method 500, the particular version of the object has a statement identifier assigned thereto. The method 600 includes comparing the begin transaction identifier of the active nested transaction to the statement identifier of the particular version of the object (act 601).

Based on this comparison, the visibility manager determines whether the particular version of the object existed at the time the active nested transaction began (decision block 602). If so ("Yes" in decision block 602), the particular version of the object is made visible to the active nested transaction (act 603). If not ("No" in decision block 602), the particular version of the object is not made visible to the active nested transaction (act 604). In order to be visible, the object version is to have been created before and is not to have been deleted until after the nested transaction began. In some embodiments, exceptions are allowed for objects created or deleted by the transaction that is doing the checking. That is, a transaction can see objects that it created and does not see objects that it deleted (subject to the Halloween problem rules—namely during the execution of a statement, changes made by the same statement are not visible to the same statement).

When the active transaction tries to perform an action upon an object, the method 600 may be performed for each version of the object until a version of the object is encountered that is visible to the active nested transaction. If no versions of the object are encountered that are visible, then no version of the object is visible to the active transaction.

In one embodiment, the only operations that can happen upon a version of an object are to create the version of the object, and to delete the version of the object. The creation of the version of the object results in the version of the object coming into being and once the transaction that created the object version commits, a first time is assigned to the version of the object (e.g., within visibility information 310). Later, when a delete operation happens upon the version of the object, the version of the object is not really deleted, but rather, when the transaction that performed the delete operation commits, a second time is assigned to the version of the object (e.g., within visibility information 310). If an object is updated, this is implemented by a deletion command for the prior version of the object, followed by a creation command on a new version of the object.

Accordingly, in this case, two operations may happen upon a version of the object, including a creation, followed by potentially a deletion. When a nested transaction is performed that includes a creation operation, when that nested transaction commits, according to FIG. 5, a statement identifier is assigned to the version of the object. This statement identifier will also be referred to herein as a "creation statement identifier". Likewise, if and when a nested transaction is performed that includes a deletion operation, when that nested transaction commits, according to FIG. 5, another statement identifier is assigned to the version of the object. This statement identifier will be referred to herein as a "deletion statement identifier".

With this in mind, several parent transactions will now be walked through to show that the methods 500 and 600 do operate to isolate nested transactions performed within a parent transaction, and also allows multiple concurrent or interleaved batches of operations to be performed as part of a single logical transaction. The first example is illustrated with respect to FIGS. 7A through 7H, and involve creation (or insert) operations only. Accordingly, only one statement identifier (the creation statement identifier) is assigned in the example of FIGS. 7A through 7H. The second example is illustrated with respect to FIGS. 8A through 8N and involves both creation and deletion statement identifiers being assigned to the object. Furthermore, in the example of FIGS. 7A through 7H and 8A through 8N, the objects being operated upon are table rows.

FIG. 7A lays out the initial state of the first example scenario. In this scenario, there are two batches of operations that are to be performed. Batch 1 involves only one operation S1 which is a row insert operation (represented as "DML" in FIG. 7A). In the general sense, this is a creation operation that will result in the creation of a new version of the row. Batch 2 involves two operations S2 and S3 being performed in sequence. Suppose that operation S3 is a read operation (represented as "SELECT" in FIG. 7A), which operates to read the same row as was operated upon by operation S1.

Recall that each operation S1, S2 and S3 are each encapsulated by a corresponding nested transaction, and that both batches 1 and 2 are within a parent transaction. For purposes of convention, the nested transactions that encapsulate operations S1, S2 and S3 will be referred to as having identifiers Tn1, Tn2 and Tn3, respectively. Furthermore, the parent transaction will be referred to as having identifier Tp. These transaction identifiers are not to be confused with the "begin transaction identifiers" and "end transaction identifiers", which are used for comparing with statement identifiers.

In order to achieve isolation, the transaction performing operation S3 should not see any changes made to any rows performed as part of operation S1, since operation S3 was initiated prior to operation S1 completing. However, the transaction performing operation S3 should see changes made to rows performed as part of operation S2, since operation S2 was completed prior to operation S3 beginning. The following will verify that this isolation is achieved.

FIG. 7B illustrates the first subsequent state of the first example in which the nested transaction Tn1 corresponding to operation S1 has just begun. Recall that method 500 is performed for each nested transaction. In act 501, a begin transaction identifier is assigned to the nested transaction as the nested transaction is begun. In FIG. 7B, this begin transaction identifier is represented as Read SID 1.

FIG. 7C illustrates an example row data structure, which represents an example of the object version 300 of FIG. 3. Here, the data 320 would be the structured row, and the visibility data 310 is represented by the Begin field, the End field, and the Statement ID field. When a creation operation is being performed on a row by a transaction, and the transaction is still active, the Begin field is populated by the nested transaction identifier (in this case Tn1 Id), which is the nested transaction identifier of the transaction that is performing operation S1. The End field is populated by a value that represents that there is no end to the time period for visibility. As an example, the value could represent infinity. The function of the Statement ID field will become clearer in the subsequent description of this example.

Figure 7D:
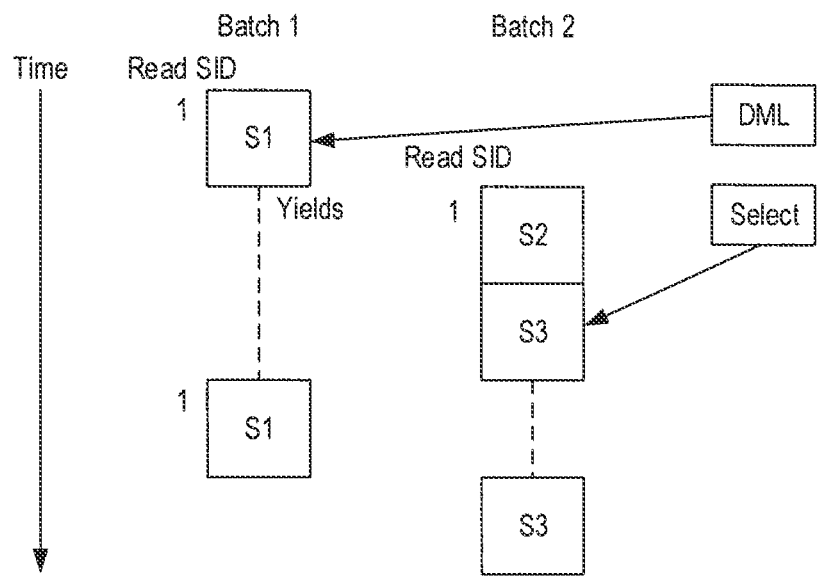

FIG. 7D illustrates a subsequent state. Here, since interleaving is permitted, the transaction Tn1 performing operation S1 yields to the second batch, which begins with a nested transaction Tn2 that performs operation S2. Since method 500 is performed for each nested transaction, the beginning of the transaction Tn2 results in a begin transaction identifier being assigned to the nested transaction Tn2. In this example, the begin transaction identifier assigned to nested transaction Tn2 is Read SID 1. In the illustrated embodiment, begin transaction identifiers can be reused if there is not a completion transaction identifier assigned in the interim. Furthermore, the begin transaction identifier (i.e., Read SID) is one more than the last completion transaction identifier (i.e., Commit SID) or 1 if there has not yet been any nested transactions completed.

Figure 7E:
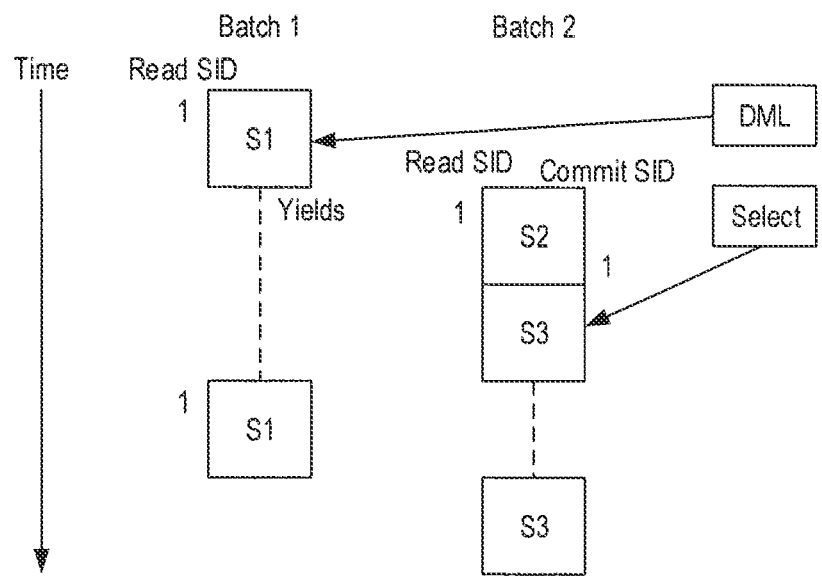

FIG. 7E illustrates a further subsequent state. Here, the transaction Tn2 that encompassed operation S2 has committed. In accordance with method 500 as performed on the nested transaction Tn2, this result in a completion transaction identifier (Commit SID 1 in FIG. 7E) being assigned to the nested transaction in accordance with act 502. Furthermore, although not shown in FIG. 7E, any rows that were created or deleted via operation S2 will be marked with the Statement ID of 1 in accordance with act 503), and control of the nested transaction Tn2 is passed to the parent transaction (act 504). Such passing of control is noted in all of the rows operated upon by the nested transaction Tn2 (e.g., by showing the parent transaction identifier in the visibility field of each row). This will become more apparent upon review of the subsequent description and FIG. 7H.

Subsequently, as represented in FIG. 7F, a transaction Tn3 that encompasses operation S3 begins. Accordingly, the method 500 is performed with respect to Tn3 by assigning a begin transaction identifier (Read SID 2) to the transaction Tn3 (act 501).

As represented in FIG. 7G, at some point, operation the transaction Tn3 performing operation S3 yields to the other batch (batch 1) to allow the transaction Tn1 to continue with the operation S1. Transaction Tn1 subsequently commits resulting in a completion transaction identifier (Commit SID 2) being assigned to the completed transaction Tn1 (act 502).

As illustrated in FIG. 7H as compared to FIG. 7C, the completion transaction identifier (i.e., 2) is also assigned as a statement identifier of the row (act 503) since that row was operated upon as part of operation S1. Furthermore, the nested transaction Tn1 turns over control over the commit or abort of the nested transaction to the parent transaction Tp. This is accomplished by placing the identifier for the parent transaction Tp into the Begin field of each row inserted as part of the operation S1, and into the End field of each row deleted as part of the operation S1. Since the row represented in FIGS. 7C and 7H was inserted as part of operation S1, the parent transaction identifier Tp is placed in the Begin field.

Referring back to FIG. 7G, after the transaction Tn1 commits, batch 1 yields back to batch 2, allowing transaction Tn3 to continue operation S3. The question now is 1) does operation S3 have visibility on changes made in operation S2 (it should because this is a shared transaction and transaction Tn2 committed prior to transaction Tn3 beginning), and 2) does operation S3 have visibility on changes made in operation S1 (it should not since transaction Tn1 had not committed at the time that transaction Tn3 began).

Operation S3 really has two phases, one before yielding, and one after being yielded back to. The visibility will be evaluated for each phase. In this embodiment, rows with Tp in the Begin field or End field are potentially visible by nested transactions within the parent transaction Tp as a parent. This contrasts with the case in which the Begin field or End field has a nested transaction Id (e.g. Tn1) which makes it invisible to other nested transactions, exception potentially for itself. First, with respect to the transaction Tn2, even prior to nested transaction Tn3 beginning, all rows that were inserted by operation S2 will have Tp within their Begin field, and all rows that were deleted by operation S2 will have Tp within their End field. When the operation S3 encounters such a row, the visibility manager will compare the Read SID 2 to the creation statement identifier 1 of the rows that were created by operation S2. Since the creation statement identifier 1 is less than the Read SID 2, the creations of the row are recognized, and those rows are potentially visible (absent an indication that the row was subsequent deleted within operation S1). The visibility manager will also compare the Read SID 2 to any deletion statement identifiers 1 of the rows deleted by operation S2. Since the deletion statement identifier 1 is less than the Read SID 2, the deletions of such rows are recognized. In short, as appropriate, operation S3 recognizes the row changes made by operation S2, since operation S2 committed prior to operation S3 beginning.

With respect to transaction Tn3 being performed before the yield, any rows altered by transaction Tn1 will have nested transaction identifier Tn1 in the Begin field (if created by nested transaction Tn1) or in the end field (if deleted by nested transaction Tn1). Accordingly, the respective creation or deletion will not be recognized by the operation S3 since the nested transaction identifier Tn3 and Tn1 are not identical. Because Tn3 and Tn1 are sibling nested transactions that share a common parent and since Tn1 has not yet committed to the parent, nested transaction Tn3 will ignore changes by nested transaction Tn1.

With respect to transaction Tn3 being performed after the yield. Now, the row created by operation S1 is marked with Tp in the Begin field, indicating that control over the commit of the operation S1 is passed to the parent. However, the visibility manager then compares the Read SID 2 to the creation statement identifier 2 of the rows that were created by operation S1. Since the object version's creation statement identifier is greater than or equal to the nested transaction's Read SID, the creation of rows performed by operation S1 are not recognized by operation S3. The visibility manager then compares the Read SID 2 to the deletion statement identifier 2 of the rows that were deleted by operation S1. Since they are equal, the deletion of rows performed by S1 are not recognized by operation S3. This is appropriate since operation S1 is to be isolated from operation S3, in that operation S3 should only see changes that have been committed before the transaction Tn3 associated with operation S3 began. Thus, complete isolation has been achieved in the example of FIGS. 7A through 7H.

Figure 8A:
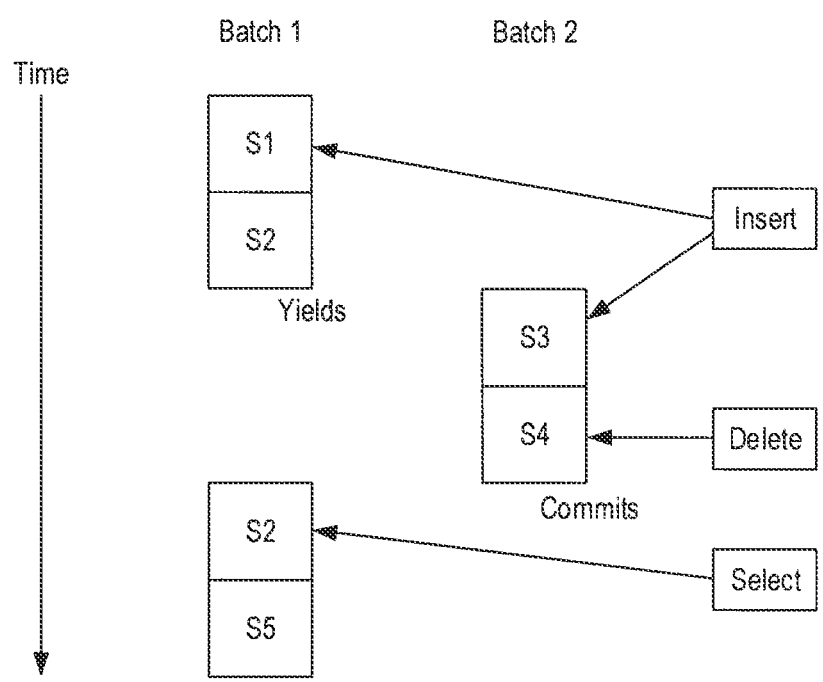
FIGS. 8A through 8N illustrate several stages in processing of another example parent transaction that includes two interleaved batches.
Figures 8B, 8C:
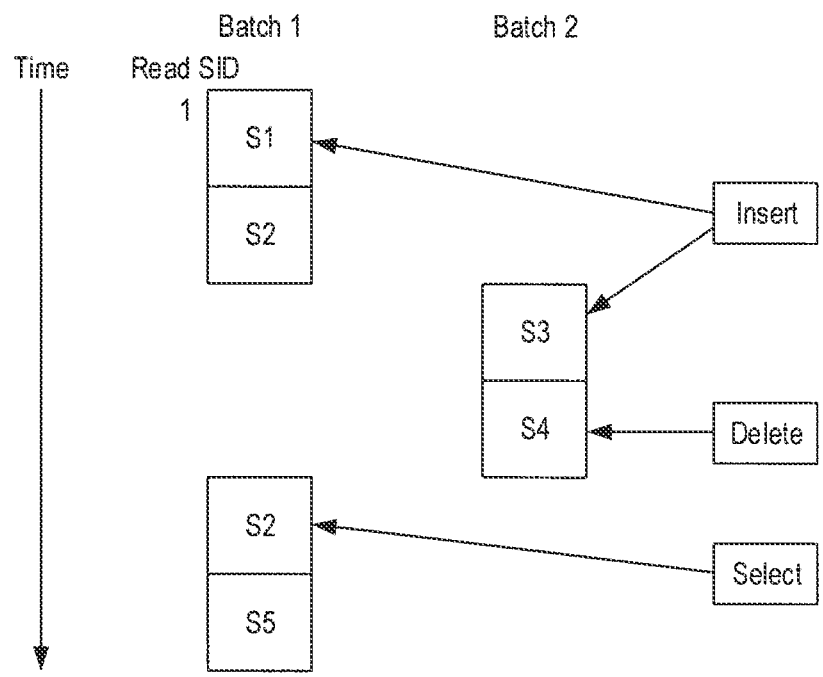
Figures 8D, 8E:
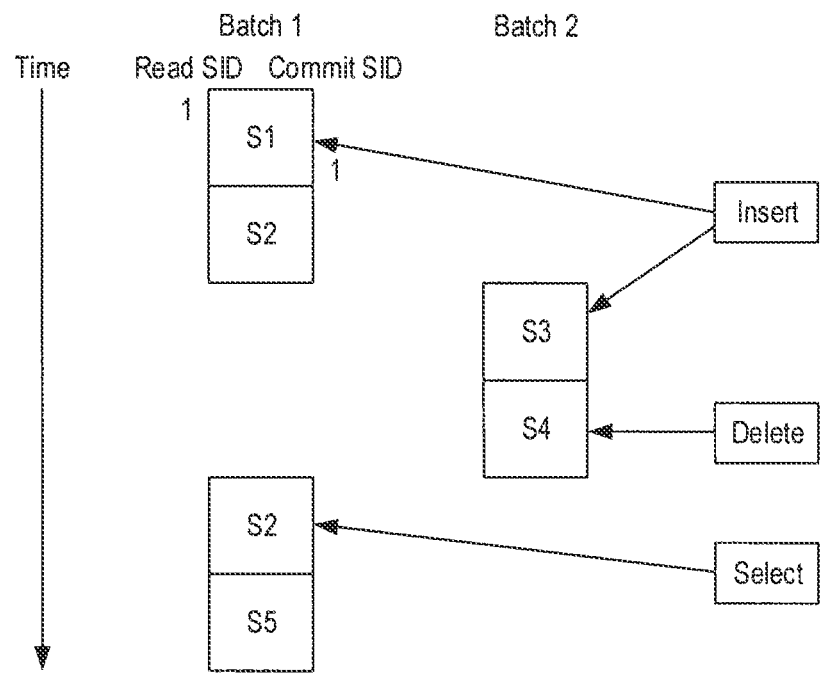
Figure 8F:
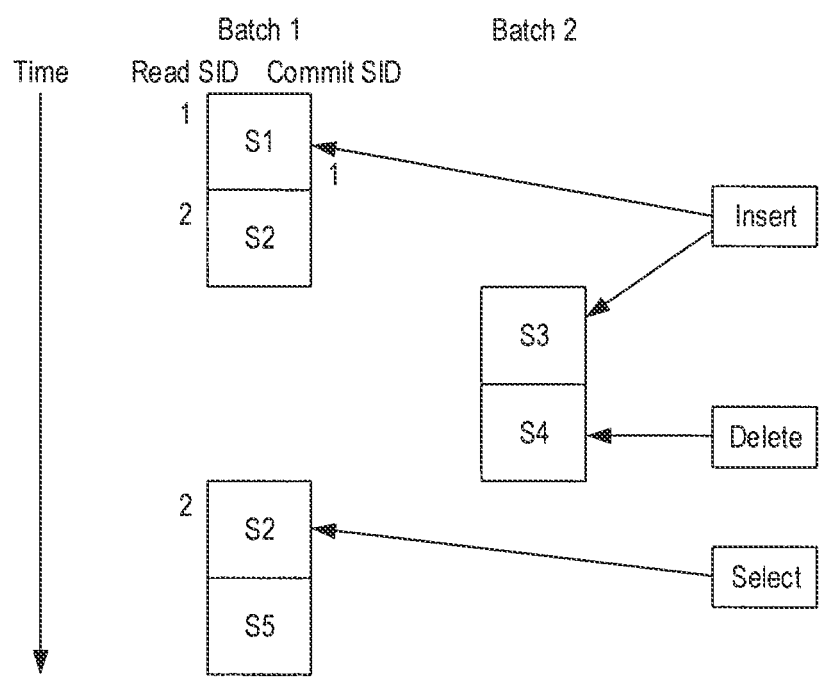
Figures 8G, 8H:
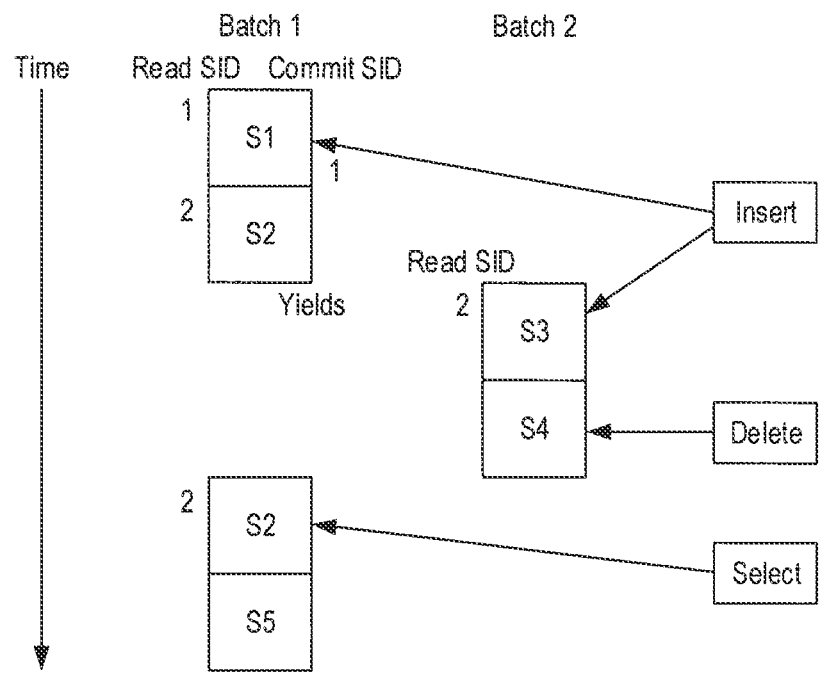
Figures 8I, 8J:
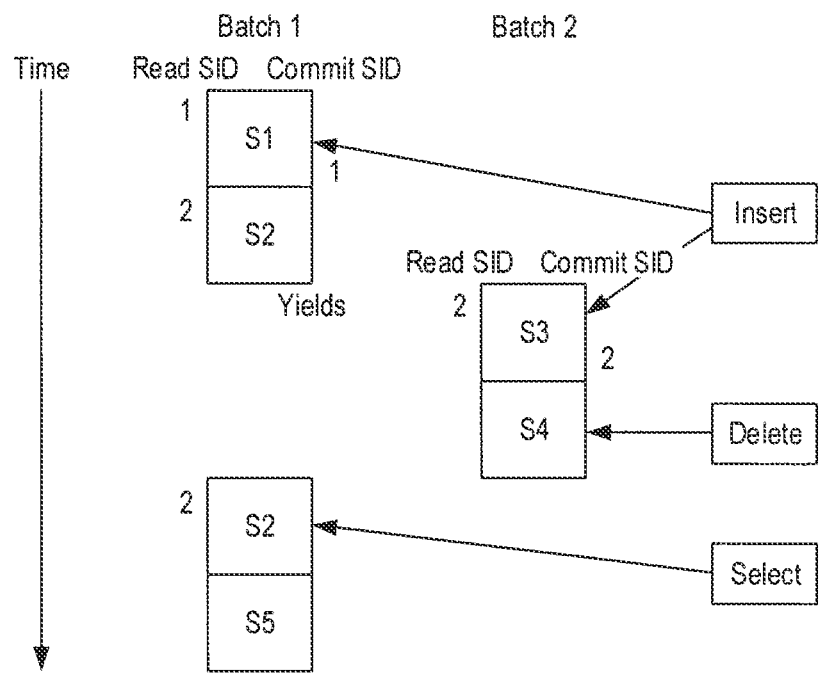
Figures 8K, 8L:
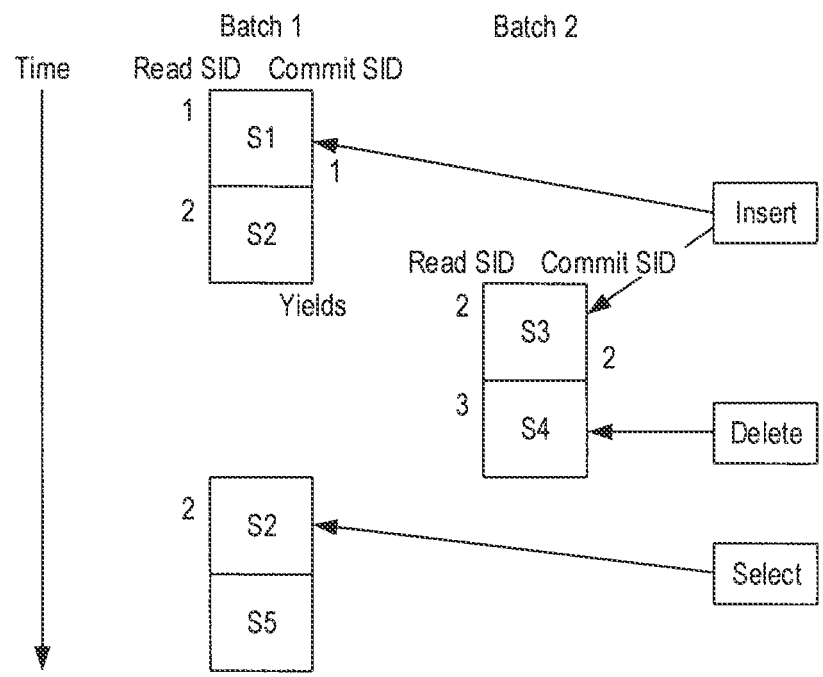
Figure 8M:
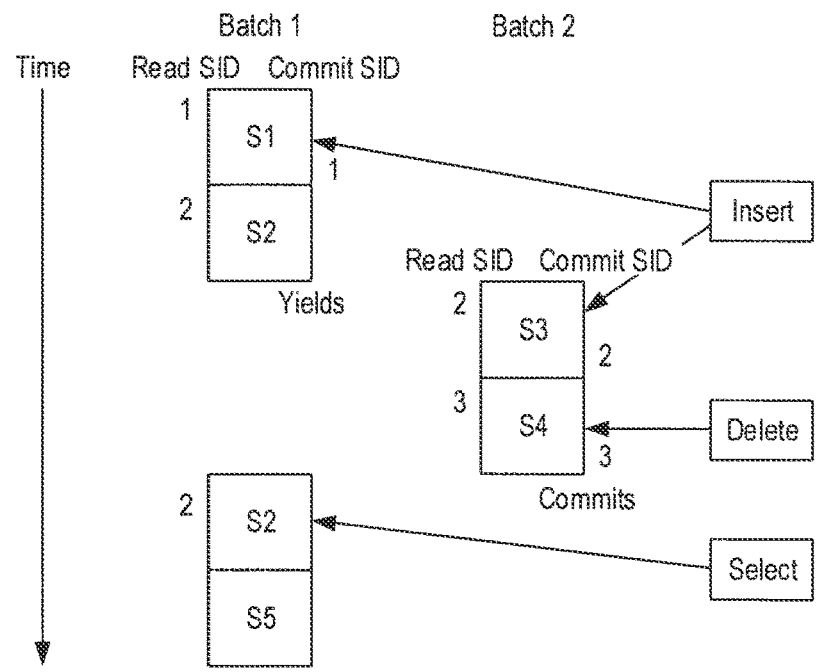
Figure 8N:
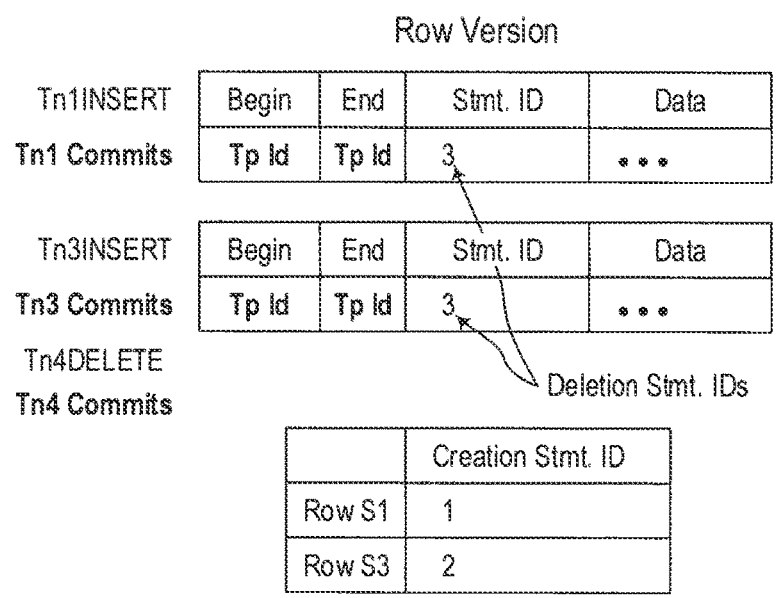

The example of FIGS. 8A through 8N is a bit more complete because now there are both creations and deletions of rows, and further there are multiple row data structures shown. Thus, we will encounter both creation statement identifiers and deletion statement identifiers. In this example, Batch 1 performs operations S1, S2 and S5 in sequence. Batch 2 performs operations S3 and S4 in sequence. Each operation is encompassed by a nested transaction. Again, for convention, the operations S1 through S5 are said to be encompassed by corresponding nested transactions having transaction identifiers Tn1 through Tn5, respectively. The parent transaction is again identified by Tp. In this example, batch 1 yields while nested transaction Tn2 is performing operation S2. This allows batch 2 to complete its entire sequence prior to yielding back.

In this second example, operations S1 and S3 are insert operations involving a creation of different rows. Operation S4 is a delete operation involving deletion of both of those rows, and operation S2 is a select operation. To achieve isolation, operation S2 should only see changes from operation S1, operation S3 should also only see changes from operation S1, and operation S4 should only see changes from operation S1 and S3.

FIG. 8B illustrates the first subsequent state of the second example in which the nested transaction Tn1 corresponding to operation S1 has just begun. Recall that method 500 is performed for each nested transaction. In act 501, a begin transaction identifier is assigned to the nested transaction as the nested transaction is begun. In FIG. 8B, this begin transaction identifier is represented as Read SID 1.

FIG. 8C illustrates an example row data structure of a first row inserted by the operation S1. As previously mentioned, when a creation operation is being performed on a row by a transaction, and the transaction is still active, the Begin field of the row data structure is populated by the nested transaction identifier (in this case Tn1 Id), which is the nested transaction identifier of the transaction that is performing operation S1. The End field is populated by a value (e.g., infinity) that represents that there is no end to the time period for visibility.

FIG. 8D illustrates a further subsequent state. Here, the transaction Tn1 that encompassed operation S1 has committed. In accordance with method 500 as performed on the nested transaction Tn1, this results in a completion transaction identifier (Commit SID 1 in FIG. 8D) being assigned to the nested transaction in accordance with act 502. Furthermore, any rows that were created or deleted via operation S1 will be marked with the Statement ID of 1 in accordance with act 503, and control of the nested transaction Tn2 is passed to the parent transaction (act 504). For instance, FIG. 8E shows a row version data structure that has been inserted by nested transaction Tn1, which has now committed. The passing of control to the parent transaction is represented in this row version data structure by the parent transaction identifier Tp being placed within the Begin field of the row version data structure. In addition, the statement identifier of 1 is seen within the Statement ID field.

FIG. 8F illustrates a subsequent state of the second example in which the nested transaction Tn2 corresponding to operation S2 has just begun. Recall again that method 500 is performed for each nested transaction. In act 501, a begin transaction identifier is assigned to the nested transaction as the nested transaction is begun. In FIG. 8F, this begin transaction identifier is represented as Read SID 2. Since the row inserted by operation S1 and represented in FIG. 8E is shown as committing control over to the parent transaction (via the Begin field containing "Tp Id"), and because the Read SID of Tn2 (2) is greater than the statement identifier 1 of the row, then the row inserted by operation S1 will be visible to the read operation S2.

FIG. 8G illustrates a subsequent state. Here, since interleaving is permitted, the transaction Tn2 performing operation S2 yields to the second batch, which begins with a nested transaction Tn3 that performs operation S3, which inserts another row. Since method 500 is performed for each nested transaction, the beginning of the transaction Tn3 results in a begin transaction identifier being assigned to the nested transaction Tn3 (act 501). In this example, the begin transaction identifier assigned to nested transaction Tn3 is Read SID 2. FIG. 8H illustrates the two relevant row data structures. The upper row data structure is identical to FIG. 8E and represents the state of the row version inserted by operation S1. The lower row data structure represents the row inserted by operation S3. Because transaction Tn3 has not yet committed in the state of FIG. 8G, the lower row data structure includes the nested transaction identifier Tn3 in its Begin field.

Note that operation S3 can see all of the changes made by operation S1 because nested transaction Tn1 has committed back to the parent transaction, and the Read SID (2) of nested transaction Tn3 is greater than the statement identifiers 1 assigned to rows changes made within operation S1. However, the operation S3 cannot see the changes made by operation S2 because transaction Tn2 has not yet committed and thus passed control to the parent.

FIG. 8I illustrates a further subsequent state. Here, the transaction Tn3 that encompassed operation S3 has committed. In accordance with method 500 as performed on the nested transaction Tn3, this result in a completion transaction identifier (Commit SID 2 in FIG. 8I) being assigned to the nested transaction Tn3 in accordance with act 502. Furthermore, any rows that were created or deleted via operation S3 will be marked with the Statement ID of 2 in accordance with act 503, and control of the nested transaction Tn3 is passed to the parent transaction (act 504). For instance, FIG. 8J shows a lower row version data structure that has been inserted by nested transaction Tn3, which has now committed. The passing of control to the parent transaction is represented in this lower row version data structure by the parent transaction identifier Tp being placed within the Begin field of the row version data structure. In addition, the statement identifier of 2 is within the Statement ID field.

FIG. 8K illustrates a subsequent state of the second example in which the nested transaction Tn4 corresponding to operation S4 has just begun. In act 501, a begin transaction identifier is assigned to the nested transaction as the nested transaction is begun. In FIG. 8K, this begin transaction identifier is represented as Read SID 3. Here, operation S4 deletes the row versions represented in FIG. 8L. The beginning of a transaction that deletes a row results in the nested transaction identifier being placed within the End field of the row version data structure. Accordingly, in FIG. 8L, the end field of both row data structures are populated with nested transaction identifier Tn4.

FIG. 8M illustrates a further subsequent state. Here, the transaction Tn4 that encompassed operation S4 has committed. In accordance with method 500 as performed on the nested transaction Tn4, this results in a completion transaction identifier (Commit SID 3 in FIG. 8M) being assigned to the nested transaction Tn4 in accordance with act 502. Furthermore, any rows that were created or deleted via operation S4 will be marked with the Statement ID of 3 in accordance with act 503, and control of the nested transaction Tn3 is passed to the parent transaction (act 504).

For instance, FIG. 8N shows that the creation statement identifier of 1 in the Statement ID field of the upper row data structure has been replaced by a deletion statement identifier of 3. However, before the creation statement identifier was replaced, it was written to a separate table so as to be preserved. This may be a relatively rare occurrence, as it occurs only if the row was created and deleted by the same parent transaction. On the other hand, if the row was created by a different (unrelated) transaction, there is no creation statement identifier to save. An alternative solution would be to provide a dedicated field within a row data structure for each of the creation and deletion statement identifiers. However, this would waste space in the case of a row never being deleted by the parent transaction, which as mentioned above, may often be the case. FIG. 8N also shows that the creation statement identifier of 2 in the Statement ID field of the lower row data structure has also been replaced by a deletion statement identifier of 3. Again, before the creation statement identifier of 2 was replaced, it was written to the separate table. Furthermore, to show that control of these two row deletion has now passed to the parent transaction, the End fields are populated with the parent transaction identifier Tp.

Batch 2 then yields to Batch 1, where the select operation S2 continues. The visibility rule for a given row having a creation statement identifier called CID, and a deletion statement identifier of DID, for an active transaction having a Read SID of a particular value can be stated as follows: the row is visible if, and only if, CID<Read SID<=DID. That is to say, a row is visible to an active transaction having a Read SID if, and only if, that Read SID is greater than the creation statement identifier of the row, and less than or equal to the deletion statement identifier of the row.

With this in mind, let us evaluate the visibility of the two rows to the selection operation S2. The select operation S2 has a Read SID of 2. As for the upper row in FIG. 8N, the creation statement identifier is 1, and the deletion statement identifier is 3. 2 is definitely greater than 1, and less than or equal to 3. Accordingly, the row inserted by operation S1 is visible to operation S2, notwithstanding that the row version was deleted by operation S4. Furthermore, as for the lower row in FIG. 8N, the creation statement identifier is 2. This rules out visibility of the row inserted by S3 to the operation S2.

Accordingly, the principles described herein allow proper isolation between nested transactions that are nested within a shared parent transaction, while allowing information to be shared with an active nested transaction to the extent that the shared information was generated by a nested transaction that committed before the active nested transaction began. This is true even for interleaved and concurrent execution of batches of operations. An interleaved implementation has been described in detail above. A concurrent implementation could operation in a very similar manner. A difference would be that a concurrent implementation would be adjusted to ensure atomicity of certain operations, such as assigning the completion statement identifier to modified object versions is atomic. This atomicity might be achieved via locks or via lock-free techniques. Thus, multiple operation batches may be performed under a single transaction and under a single connection, without one batch having to follow the other, but rather with the batches being concurrently performed or performed in an interleaved fashion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
one or more processors; and
one or more computer-readable storage devices having stored thereon instructions that are executable by the one or more processors to execute a plurality of nested transactions, within a shared parent transaction, that perform operations on an object, including performing at least:
based at least on executing a first nested transaction of the plurality of nested transactions, perform the following:
assign a first begin transaction identifier to the first nested transaction, the first begin transaction identifier indicating that the first nested transaction has begun operating upon the object; and
based at least on completion of the first nested transaction, assign a completion transaction identifier as a statement identifier to a version of the object, the completion transaction identifier indicating that the first nested transaction has completed; and based at least on executing a second nested transaction of the plurality of nested transactions, perform the following:
compare a second begin transaction identifier of the second nested transaction with the statement identifier of the version of the object; and
based on the comparison, determine whether the version of the object existed at a time that the second nested transaction began.

2. The computer system of claim 1, wherein the version of the object is determined to have existed at the time that the second nested transaction began based at least on a first value of the statement identifier being less than a second value of the second begin transaction identifier.

3. The computer system of claim 1, the instructions also being executable by the one or more processors to compare the second begin transaction identifier to an end transaction identifier of the version of the object.

4. The computer system of claim 3, wherein the version of the object is determined to have not existed at the time that the second nested transaction began based at least on a third value of the end transaction identifier being less than the second value of the second begin transaction identifier.

5. The computer system of claim 1, the instructions also being executable by the one or more processors to determine that the version of the object is visible to the second nested transaction based at least on determining that the statement identifier of the version of the object indicates that the first nested transaction committed before the second nested transaction began.

6. The computer system of claim 5, the instructions also being executable by the one or more processors to read the version of the object by the second nested transaction based at least on the version of the object being visible to the second nested transaction.

7. The computer system of claim 1, wherein the object comprises at least one of a multi-version relational database object or a multi-version structured object.

8. The computer system of claim 1, the instructions also being executable by the one or more processors to, upon completion of the first nested transaction, amend the version of the object to turn over commit or abort of the first nested transaction to the shared parent transaction.

9. The computer system of claim 1, wherein the version of the object is determined to have existed at the time that the second nested transaction began, and wherein the second nested transaction performs an insert operation on the object to thereby create a new version of the object, and to thereby create a new statement identifier for the new version of the object.

10. A method, implemented at a computer system that includes one or more processors, for executing a plurality of nested transactions, within a shared parent transaction, that perform operations on an object, the method comprising:
based at least on executing a first nested transaction of the plurality of nested transactions, perform the following:
assign a first begin transaction identifier to the first nested transaction, the first begin transaction identifier indicating that the first nested transaction has begun operating upon the object; and
based at least on completion of the first nested transaction, assign a completion transaction identifier as a statement identifier to a version of the object, the completion transaction identifier indicating that the first nested transaction has completed; and
based at least on executing a second nested transaction of the plurality of nested transactions, perform the following:
compare a second begin transaction identifier of the second nested transaction with the statement identifier of the version of the object; and
based on the comparison, determine whether the version of the object existed at a time that the second nested transaction began.

11. The method of claim 10, wherein the version of the object is determined to have existed at the time that the second nested transaction began based at least on a first value of the statement identifier being less than a second value of the second begin transaction identifier.

12. The method of claim 10, further comprising comparing the second begin transaction identifier to an end transaction identifier of the version of the object.

13. The method of claim 12, wherein the version of the object is determined to have not existed at the time that the second nested transaction began based at least on a third value of the end transaction identifier being less than the second value of the second begin transaction identifier.

14. The method of claim 10, further comprising determining that the version of the object is visible to the second nested transaction based at least on determining that the statement identifier of the version of the object indicates that the first nested transaction committed before the second nested transaction began.

15. The method of claim 14, further comprising reading the version of the object by the second nested transaction based at least on the version of the object being visible to the second nested transaction.

16. The method of claim 10, wherein the object comprises at least one of a multi-version relational database object or a multi-version structured object.

17. The method of claim 10, further comprising, upon completion of the first nested transaction, amending the version of the object to turn over commit or abort of the first nested transaction to the shared parent transaction.

18. The method of claim 10, wherein the version of the object is determined to have existed at the time that the second nested transaction began, and wherein the second nested transaction performs an insert operation on the object to thereby create a new version of the object, and to thereby create a new statement identifier for the new version of the object.

19. A computer program product comprising one or more hardware storage devices having stored thereon instructions that are executable by one or more processors to execute a plurality of nested transactions, within a shared parent transaction, that perform operations on an object, including performing at least:
based at least on executing a first nested transaction of the plurality of nested transactions, perform the following:
assign a first begin transaction identifier to the first nested transaction, the first begin transaction identifier indicating that the first nested transaction has begun operating upon the object; and
based at least on completion of the first nested transaction, assign a completion transaction identifier as a statement identifier to a version of the object, the completion transaction identifier indicating that the first nested transaction has completed; and
based at least on executing a second nested transaction of the plurality of nested transactions, perform the following:

compare a second begin transaction identifier of the second nested transaction with the statement identifier of the version of the object; and based on the comparison, determine whether the version of the object existed at a time that the second nested transaction began.

20. The computer program product of claim 19, wherein the version of the object is determined to have existed at the time that the second nested transaction began based at least on a first value of the statement identifier being less than a second value of the second begin transaction identifier.

* * * * *